(12) United States Patent
Tanaka

(10) Patent No.: US 9,106,862 B2
(45) Date of Patent: Aug. 11, 2015

(54) PRINT CONTROL DEVICE, INKJET RECORDING APPARATUS, PRINT CONTROL METHOD, AND PRINTING SYSTEM

(71) Applicant: CANON FINETECH INC., Misato-shi, Saitama-ken (JP)

(72) Inventor: Yusuke Tanaka, Misato (JP)

(73) Assignee: CANON FINETECH INC., Saitama-Ken (JP)

( * ) Notice: Subject to any disclaimer, the term of this patent is extended or adjusted under 35 U.S.C. 154(b) by 0 days.

(21) Appl. No.: 14/071,729

(22) Filed: Nov. 5, 2013

(65) Prior Publication Data

US 2014/0152729 A1 Jun. 5, 2014

(30) Foreign Application Priority Data

Dec. 4, 2012 (JP) ................................ 2012-265650
Oct. 24, 2013 (JP) ................................ 2013-221475

(51) Int. Cl.

| | |
|---|---|
| *B41J 2/07* | (2006.01) |
| *H04N 1/40* | (2006.01) |
| *B41J 2/21* | (2006.01) |
| *H04N 1/401* | (2006.01) |
| *H04N 1/00* | (2006.01) |
| *H04N 1/23* | (2006.01) |

(52) U.S. Cl.
CPC ........... *H04N 1/40087* (2013.01); *B41J 2/2121* (2013.01); *H04N 1/4015* (2013.01); *H04N 1/00238* (2013.01); *H04N 1/2315* (2013.01)

(58) Field of Classification Search
CPC .............. H04N 1/40087; H04N 1/60; H04N 2201/33378; B41J 19/147; B41J 2/07
USPC ............. 347/14, 15, 19, 43, 47, 57; 358/461, 358/501, 504, 518, 520, 523
See application file for complete search history.

(56) References Cited

U.S. PATENT DOCUMENTS

| | | | | |
|---|---|---|---|---|
| 5,823,690 | A * | 10/1998 | Narushima et al. | 400/120.07 |
| 6,386,668 | B1 * | 5/2002 | Shimizu et al. | 347/13 |
| 6,893,114 | B2 * | 5/2005 | Yano et al. | 347/43 |

FOREIGN PATENT DOCUMENTS

| | | |
|---|---|---|
| JP | 2000-255067 | 9/2000 |
| JP | 2003-131829 | 5/2003 |
| JP | 2003-231245 A | 8/2003 |
| JP | 2003-319167 | 11/2003 |
| JP | 2006-142619 | 6/2006 |

* cited by examiner

*Primary Examiner* — Thinh Nguyen
(74) *Attorney, Agent, or Firm* — Fitzpatrick, Cella, Harper & Scinto

(57) ABSTRACT

A print control device communicably connected to an inkjet recording apparatus capable of performing form overlay printing for incorporating original document data into form data, the print control device comprising: a correction unit that performs head shading correction on the form data based on information of a characteristic of a nozzle of a recording head provided in the inkjet recording apparatus; a storage unit that stores the form data therein; and a control unit that, upon reception of information on another recording head different from the recording head, causes the correction unit to perform head shading correction on the form data stored in the storage unit based on information of a characteristic of a nozzle of the another recording head, and causes a transmission unit to transmit, to the inkjet recording apparatus, the original document data and corrected form data corresponding to the another recording head.

15 Claims, 8 Drawing Sheets

PRINT CONTROL DEVICE, INKJET RECORDING APPARATUS, PRINT CONTROL METHOD, AND PRINTING SYSTEM

BACKGROUND OF THE INVENTION

1. Field of the Invention

The present invention relates to a print control device, an inkjet recording apparatus, a print control method, and a printing system each for processing data for form overlay printing.

2. Description of the Related Art

In general, a nozzle shape varies among a plurality of nozzles included in a recording head provided in an inkjet recording apparatus due to a nozzle forming process. Such variation causes variation in an ink amount discharged from each nozzle, thereby causing print density unevenness.

In regard to the inkjet recording apparatus, there has been widely known a piezoelectric method that uses a piezoelectric element, and the like method, as well as a heater driving method in which a heater is provided in each nozzle and an ink is discharged by use of bubbles generated by selectively heating and boiling the ink. In the heater driving method, it is possible to control an ink amount to be discharged, by controlling a driving pulse width to drive the heater provided per nozzle. However, even if an ink discharge amount is adjustable by the method, it is actually difficult to completely cope with nonuniformity in output images. Further, in a case where the number of nozzles is extremely large, if driving pulse widths of all the nozzles are controlled individually, problems with an increase of a circuit scale and an increase of a manufacturing cost may be caused.

In view of this, head shading correction may be performed to correct a printed image. In general, the head shading correction is performed on a multiple-valued image signal (e.g., a CMYK signal) converted, per recording head of a printing device, from an RGB signal constituting an original image of the printed image. Japanese Patent Application Laid-Open No. 2003-231245 discloses a printing system constituted by a printing device and a PC terminal device and performing a head shading technique. Japanese Patent Application Laid-Open No. 2003-231245 discloses that in order to establish consistency between a plurality of pieces of characteristic information of nozzles constituting a recording head of the printing device, and that recording head of the printing device which is connected to a host PC, printing characteristic data peculiar to the recording head is written in a memory in the recording head.

In the meantime, there has known a printing technique called form overlay in order to create a printed material in which desired data is written with respect to a given format (form). In the form overlay, form data indicative of a form part is created in advance, external data such as values or text strings is incorporated (overlaid) in a predetermined place (a field graphic) of the form data, and an image is printed or displayed.

In general, the recording head is attachable and detachable in the printing device and may be replaced by a user. When the recording head is replaced, naturally, printing characteristic data peculiar to the recording head and to be used for head shading correction is also changed. When the printing characteristic data is changed from one at the time of creating the form data, the head shading correction is not performed appropriately at the time of form overlay printing, thereby causing print density unevenness.

SUMMARY OF THE INVENTION

An object of the present invention is to solve such a conventional problem. In view of the above point, the present invention is intended to provide a print control device, an inkjet recording apparatus, a print control method, and a printing system each for preventing a decrease in image quality in form overlay printing even if a recording head is replaced.

In order to achieve the above object, a print control device according to the present invention is a print control device communicably connected to an inkjet recording apparatus capable of performing form overlay printing to incorporate original document data into form data, and the print control device includes: a correction unit that performs head shading correction on the form data based on information of a characteristic of a nozzle of a recording head provided in the inkjet recording apparatus; a storage unit that stores the form data therein; a transmission unit for transmitting, to the inkjet recording apparatus, the original document data and corrected form data, which is corrected by the correction unit; and a control unit that, upon reception of information on another recording head different from the recording head, causes the correction unit to perform head shading correction on the form data stored in the storage unit based on information of a characteristic of a nozzle of the another recording head, and causes the transmission unit to transmit, to the inkjet recording apparatus, the original document data and corrected form data corresponding to the another recording head.

According to the present invention, even if a recording head is replaced, it is possible to prevent a decrease in image quality in form overlay printing.

Further features of the present invention will become apparent from the following description of exemplary embodiments with reference to the attached drawings.

DESCRIPTION OF THE EMBODIMENTS

The following describes a preferred embodiment of the present invention in detail with reference to the attached drawings. Note that, the following embodiment does not limit the present invention according to Claims, and further, all combinations of features described in the present embodiment may not be essential to the solution of the present invention. The same constituent components have the same reference sign, and are not explained.

Figure 1:
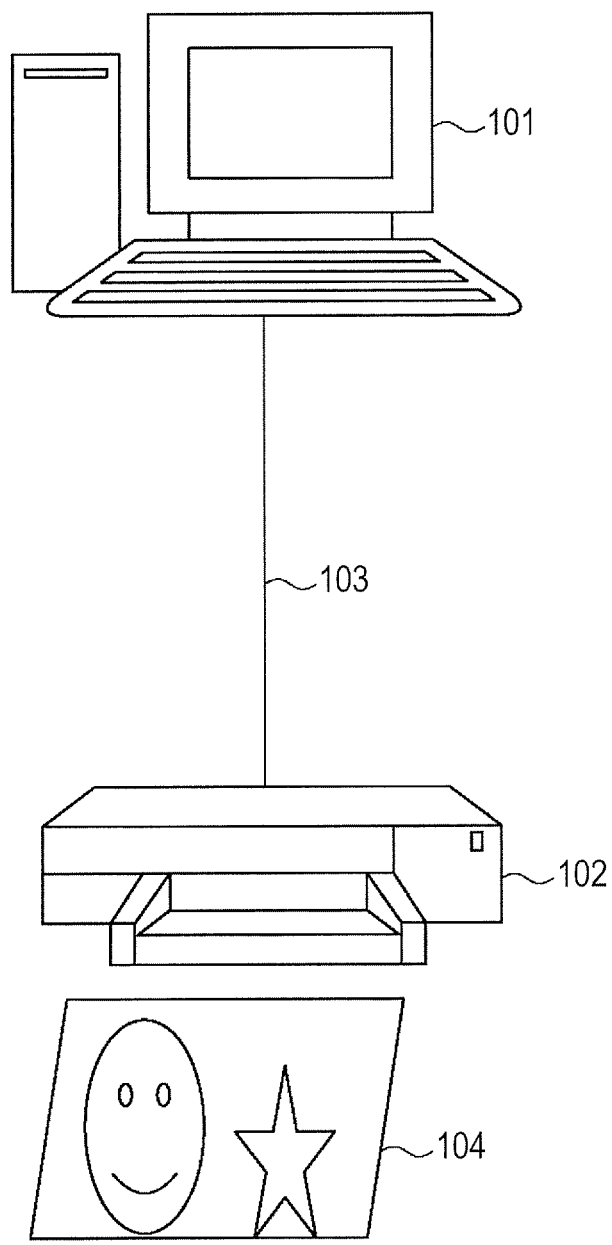
FIG. 1 is a view illustrating a configuration of a printing system.

FIG. 1 is a view illustrating a configuration of a printing system according to an embodiment of the present invention. This printing system includes a host PC 101, which is a print control device for generating print data, and a printing device 102 capable of performing form overlay printing according to an instruction from the host PC 101. The following description of the present embodiment describes an example of the printing device 102 as an inkjet recording apparatus. The host PC 101 and the printing device 102 are able to communicate with each other via an interconnection cable 103. The printing device 102 performs form overlay printing on a recording medium 104 such as printing paper based on form data and original document data received from the host PC 101. The form overlay printing is a printing method in which form data indicative of a form part is created in advance, and external data (original document data) such as values or text strings is incorporated (overlaid) in a predetermined place of the form data. The form overlay printing is also referred to as changeable printing or variable printing.

Figure 2:
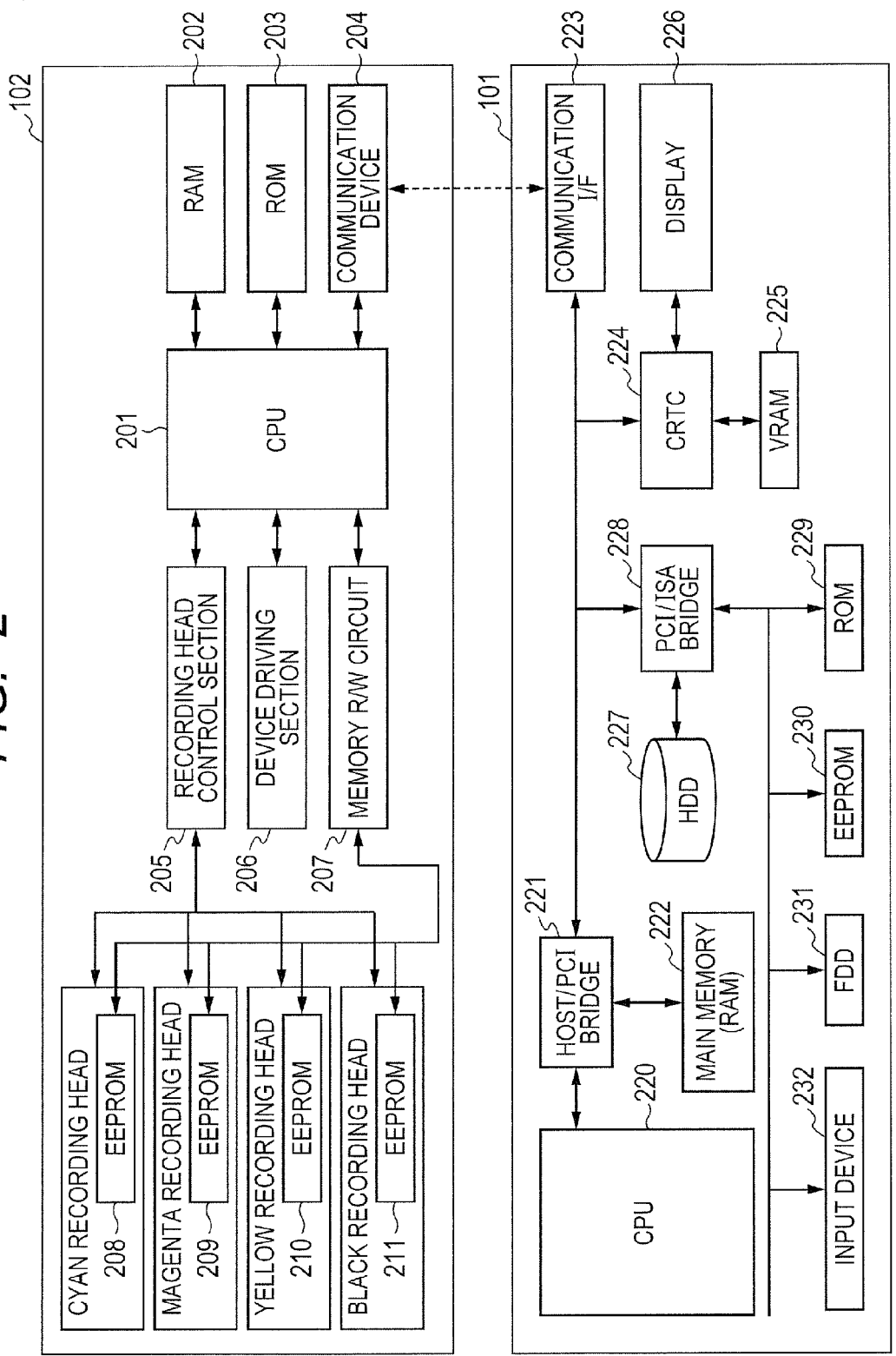
FIG. 2 is a view illustrating a block configuration inside each of a host PC and a printing device.

FIG. 2 is a view illustrating a functional block configuration inside each of the host PC 101 and the printing device 102. The host PC 101 is a general personal computer, for example. A CPU 220 performs various programs stored in a memory region such as RAM or the like, under control of an operating system (OS), thereby realizing an operation of the present embodiment.

In the host PC 101, a PCI bus and an ISA bus, which are a local bus, are hierarchically constructed via a host/PCI bridge 221 and a PCI/ISA bridge 228, thereby constructing a system bus as a whole. Each block in the host PC 101 mutually transmits and receives data via a system bus. Note that a high-speed memory (not shown) called a L2 cache is connected to the system bus, and a code and data to which the CPU 220 always accesses are stored therein.

A memory 222 is a memory region for temporarily storing therein execution programs, such as the operation system (OS), application programs, and a printer driver. Further, the memory 222 is also used as a memory region for an operation of executing each program. The memory 222 stores therein RGB image data subjected to a drawing process by an application program, ink color data corresponding to each ink color of each recording head of the printing device 102 which ink color data is subjected to color-space conversion from the RGB image data, and the like. In the present embodiment, the ink color data is multiple-valued image data corresponding to each ink color of cyan, magenta, yellow, and black.

The PC 101 develops, on the main memory 222, all of data corrected based on head shading (HS) correction data acquired from the printing device 102, print data binarized by an error diffusion method or the like, and the like data. Then, the PC 101 transmits the binarized print data and the like data to the printing device 102 via a communication interface 223. The communication interface 223 is, for example, a USB, a network, and the like, and is connected to a PCI bus.

The CRTC 224 is a video controller, and reads bitmap data for display which is written in a VRAM 225 by the CPU 220 and transfers it to a display 226 such as CRT, LCD, and PDP. A user can recognize a process progress and a process result of an instructed print job, for example, on the display 226.

An ROM 229 stores therein a BIOS (Basic Input Output System) program for controlling an input-output device such as an input device 232 and an FDD 231, an initial program at the time of power activation, a self-diagnostic program, and the like. Here, the input device 232 is, for example, a keyboard and a pointing device. The user is able to instruct printing or the like in the printing device 102, for example, via the input device 232. An EEPROM 230 is a rewritable nonvolatile memory in which to store various parameters to be used permanently, and stores printing characteristic data of each recording head, for example.

Figure 3:
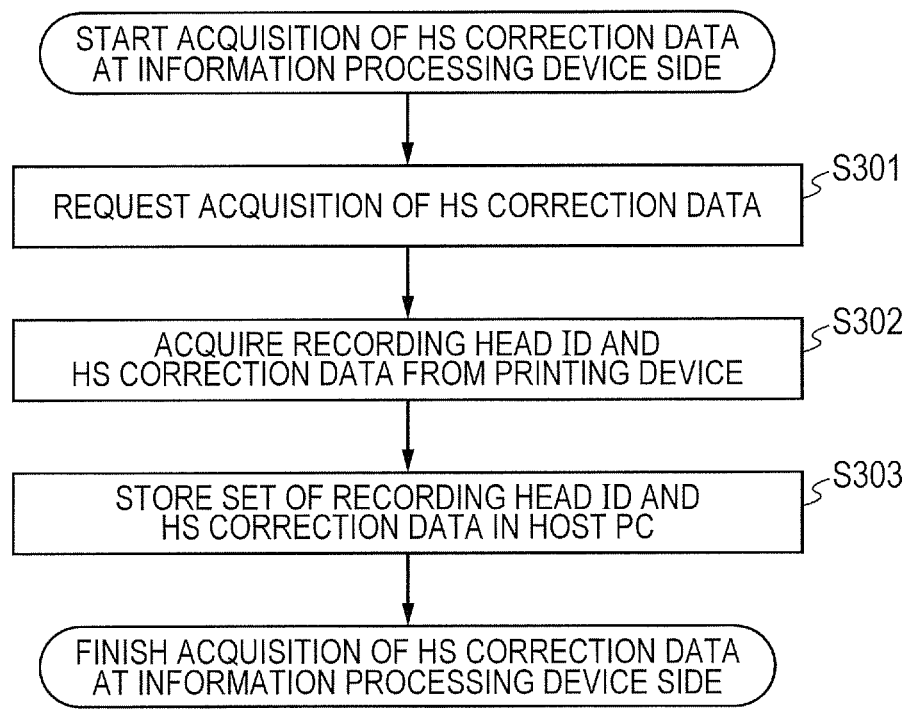
FIG. 3 is a view illustrating a procedure of a process at the time when a request to transmit HS correction data is performed.

The operating system (OS), various application programs, a program to execute each process in FIG. 3, a printer driver corresponding to the printing device 102, and the like are loaded from an HDD 227 into the main memory 222, and executed by the CPU 220. An acquisition process of HS correction data, as illustrated in FIG. 3, may be performed automatically at the time when the printing device 102 is newly connected to the host PC 101, or may be performed manually by the user at a desired timing.

The printing device 102 includes an ROM 203 for storing print data and the like, an RAM 202 for storing a control program, a communication device 204 serving as an interface via which communications with the host PC 101 are performed, and a recording head control section 205 for performing a driving control on each recording head. Further, the printing device 102 includes a device driving section 206 for performing a driving control on an actuator and the like for recording medium conveyance, and a memory control circuit 207 for controlling reading and writing (R/W) with respect to HS correction data from memories 208 to 211 (an example of a density characteristic information storage section) in respective recording heads. The CPU 220 performs various programs stored in the RAM 202, thereby realizing an operation of the present embodiment. The printing device 102 is equipped with line-type recording heads (hereinafter just referred to as recording heads) corresponding to respective nozzle arrays of four colors, i.e., cyan, magenta, yellow, and black. The present embodiment deals with the above four colors, but may also include a color except for the four colors, such as light cyan, or a characteristic ink color for a specific object. Each of the recording heads is attached to a carriage or the like in a removable manner.

Figure 8:
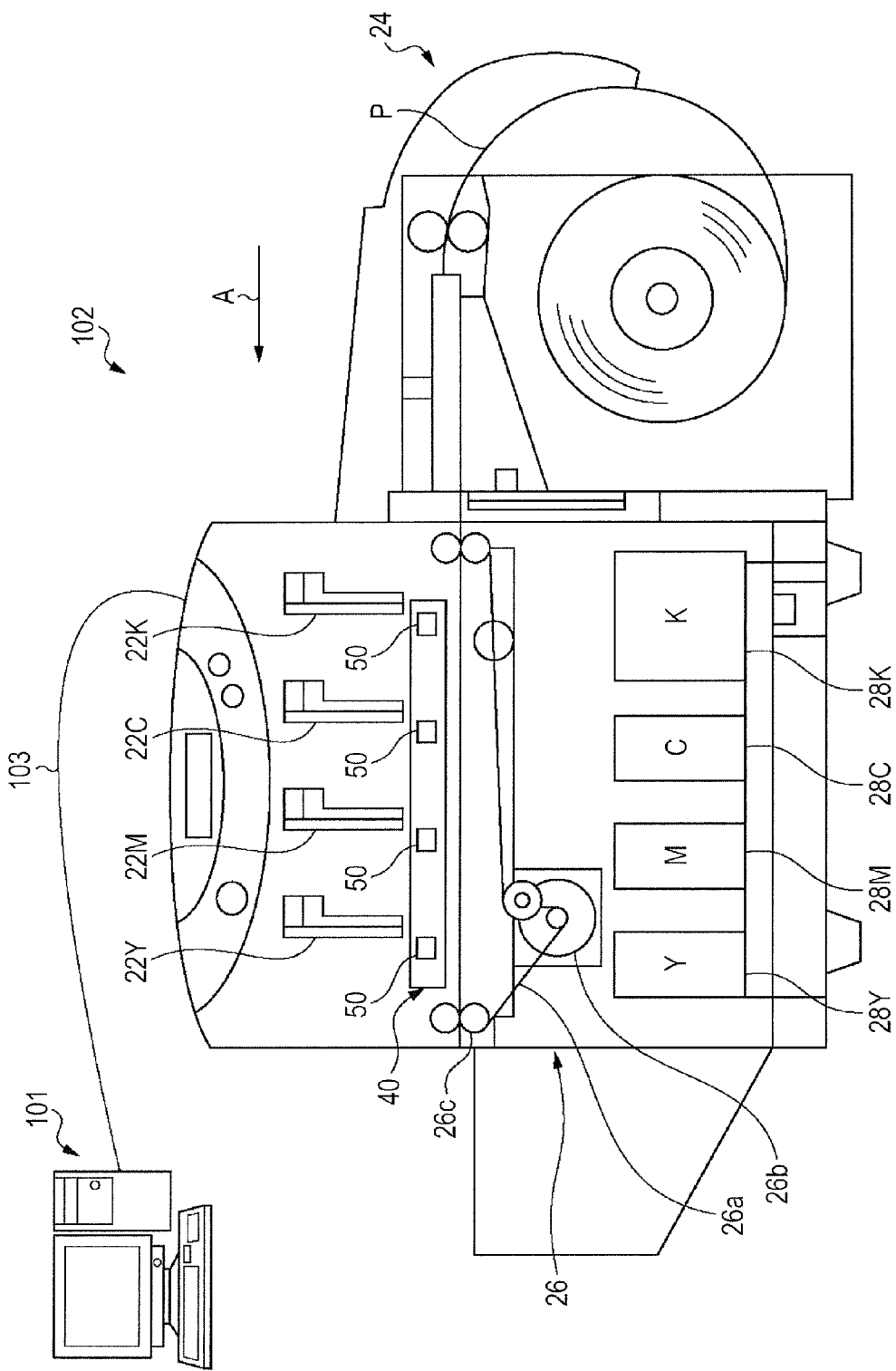
FIG. 8 is a view illustrating an exemplary configuration of the printing device.

FIG. 8 is a schematic view illustrating a configuration of the printing device 102 in the present embodiment. The printing device 102 performs recording on a recording medium P by discharging inks from recording heads 22K, 22C, 22M, and 22Y based on recording data as a print target transmitted from the host PC 101. The recording heads 22K, 22C, 22M, and 22Y corresponding to the four multiple colors are sequentially placed along a conveying direction (a direction of an arrow A) of the recording medium P. The recording heads are placed, with respect to the conveying direction, in the order of the recording head 22K for black ink, the recording head 22C for cyan ink, the recording head 22M for magenta ink, and the recording head 22Y for yellow ink. The recording heads 22K, 22C, 22M, and 22Y are so-called full-line type recording heads, and are aligned in parallel to each other so as to entirely cover a recording width with respect to the conveying direction of the recording medium. At the time of recording, the inkjet recording apparatus 10 performs recording without moving the respective recording heads in such a manner that heaters provided in the respective recording heads are driven so that respective ink discharge openings (nozzles) discharge ink.

Along with the recording by the recording heads, foreign substances such as dust or ink drops are attached to surfaces (nozzle faces) including the nozzles of the recording heads 22K, 22C, 22M, and 22Y and a discharge state is changed, which may affect recording. In view of this, the printing device 102 is provided with a recovery unit 40 so that it is possible to stably discharge ink from each of the recording heads 22K, 22C, 22M, and 22Y. By regularly performing cleaning of the nozzle faces by the recovery unit 40, it is possible to maintain or recovery a good ink discharge state from the nozzles of the recording heads 22K, 22C, 22M, and 22Y. Further, the recovery unit is provided with caps 50 for removing ink from respective ink discharge opening surfaces of the four recording heads 22K, 22C, 22M, and 22Y at the time of a cleaning operation. The caps 50 are provided for the respective recording heads 22K, 22C, 22M, and 22Y, and each of the caps 50 includes a blade, an ink removal member, a blade hold member, a cap, etc.

The recording medium P, which is a roll sheet, is supplied from a roll sheet supply unit 24, and is conveyed in the direction of the arrow A by a conveyance mechanism 26 provided in the printing device 102. The conveyance mechanism 26 includes a conveyance belt 26a for conveying the recording medium P in such a manner that the recording medium P is placed thereon, a conveyance motor 26b for rotating the conveyance belt 26a, a roller 26c for giving a tensile force to the conveyance belt 26a, etc. At the time of recording, when the recording medium P under conveyance reaches below the recording head 22K, a black ink is discharged from the recording head 22K based on recording data transmitted from the host PC 101. Similarly, inks of respective colors are sequentially discharged from the recording heads 22C, 22M, and 22Y in this order, so that color recording is performed on the recording medium P. Further, the printing device 102 is provided with ink tanks 28K, 28C, 28M, and 28Y for accumulating therein respective inks to be supplied to the respective recording heads, pumps capable of filling the respective recording heads with the respective inks, pumps for performing a cleaning operation, and the like.

Here, FIG. 2 is referred to, again. As each of the memories 208 to 211 in the respective recording heads, an EEPROM, which is a rewritable nonvolatile memory, is used. In each of the memories 208 to 211, its corresponding recording head ID and HS correction data is written in advance before the operation according to the present embodiment is performed, for example, at the time of manufacturing and shipping, or the like. The recording head ID is assigned such that recording heads of the same color do not have the same recording head ID and recording heads of different colors do not have the same recording head ID. Here, the HS correction data indicates density characteristic information corresponding to a nozzle array of a recording head for each ink color. Due to manufacturing errors, nozzles have different ink discharge characteristics. When head shading correction is performed on image data or the like as a print target, the density characteristic information is referred to and density correction corresponding to each nozzle is performed on the image data or the like as the print target, so as to be closer to ideal density. Naturally, the density characteristic information is changed when the user replaces the recording head. Accordingly, the printing device 102 stores, in each of the memories 208 to 211 in the respective recording heads, its corresponding HS correction data indicative of density characteristic information, together with its corresponding recording head ID.

Referring now to FIG. 3, the following describes an operation when a request to transmit HS correction data stored in each of the memories 208 to 211 of the respective recording heads is performed from the host PC 101 to the printing device 102 in order that the host PC 101 performs a head shading (HS) process on form data. The process of FIG. 3 is realized by the CPU 220 performing a printer driver loaded in the memory 222. The process of FIG. 3 is performed at a timing when the head shading process is performed in response to an instruction from the user via the input device 232, besides a timing of executing the form overlay printing, for example. Alternatively, the process of FIG. 3 may be performed at a timing when a connection to the printing device 102 is recognized at the time of a start-up of the host PC 101.

Initially, the CPU 220 requests HS correction data about respective ink colors with respect to the printing device 102 (S301). In response to the request from the host PC 101, the printing device 102 acquires recording head IDs and pieces of HS correction data for the respective ink colors from the memories 208 to 211, and transmits them to the host PC 101. The CPU 220 acquires the recording head IDs and the pieces of HS correction data for all ink colors of the printing device 102 (S302). The CPU 220 associates a corresponding recording head ID with a corresponding piece of HS correction data for each of the ink colors, and stores them as an HS correction data set in a memory region such as the RAM 222 or the HDD 227 (S303).

Figure 4:
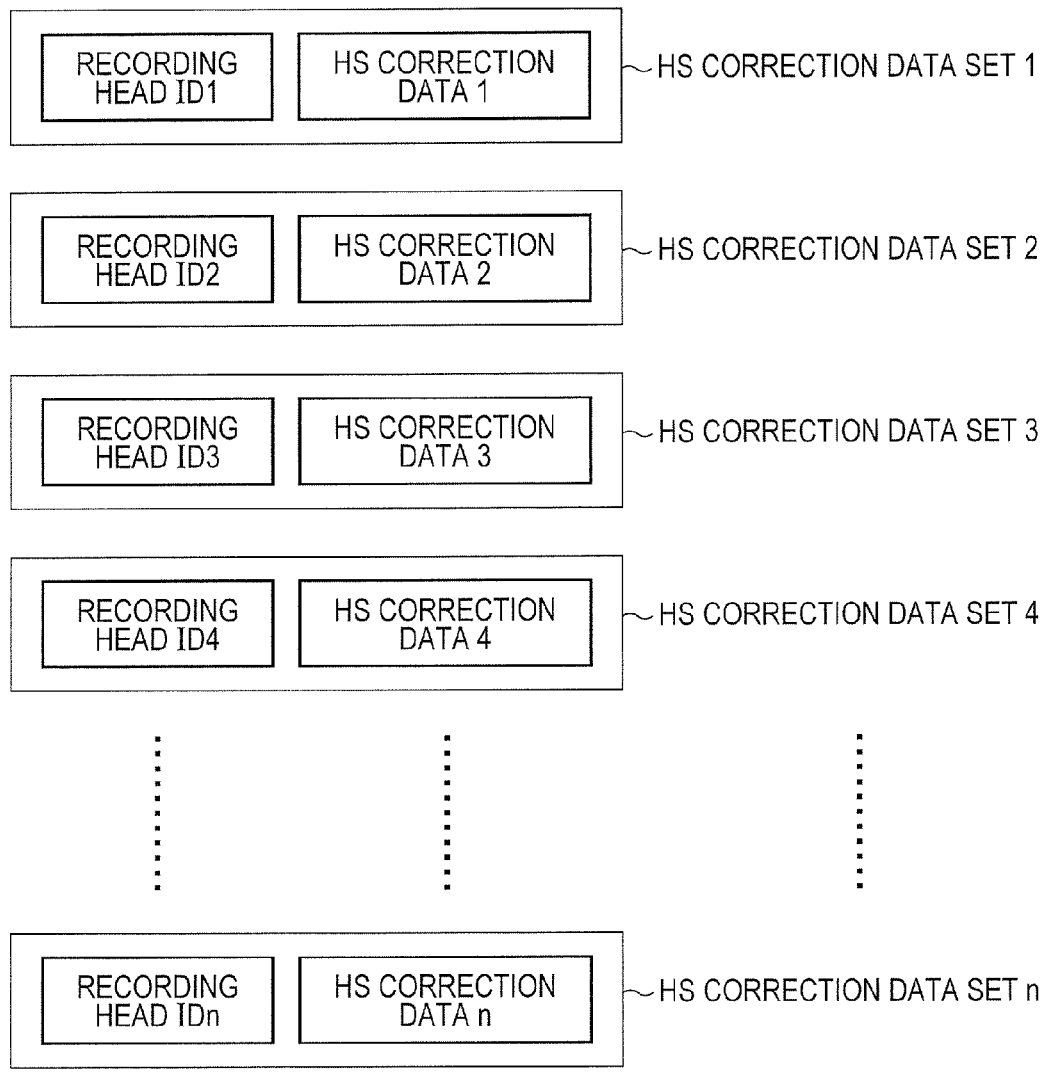
FIG. 4 is a view illustrating HS correction data sets.

FIG. 4 is a view illustrating HS correction data sets acquired and stored in the process of FIG. 3. As illustrated in FIG. 4, one recording head ID and one piece of HS correction data corresponding thereto are associated with each other. FIG. 4 illustrates HS correction data sets for all ink colors of the printing device 102. However, in a case where there is a plurality of target printing devices from which HS correction data is acquired, the HS correction data sets illustrated in FIG. 4 may be stored per printing device. Further, in a case where a recording head is replaced in a printing device from which HS correction data has been already acquired, the CPU 220 acquires HS correction data once again.

Figure 5:
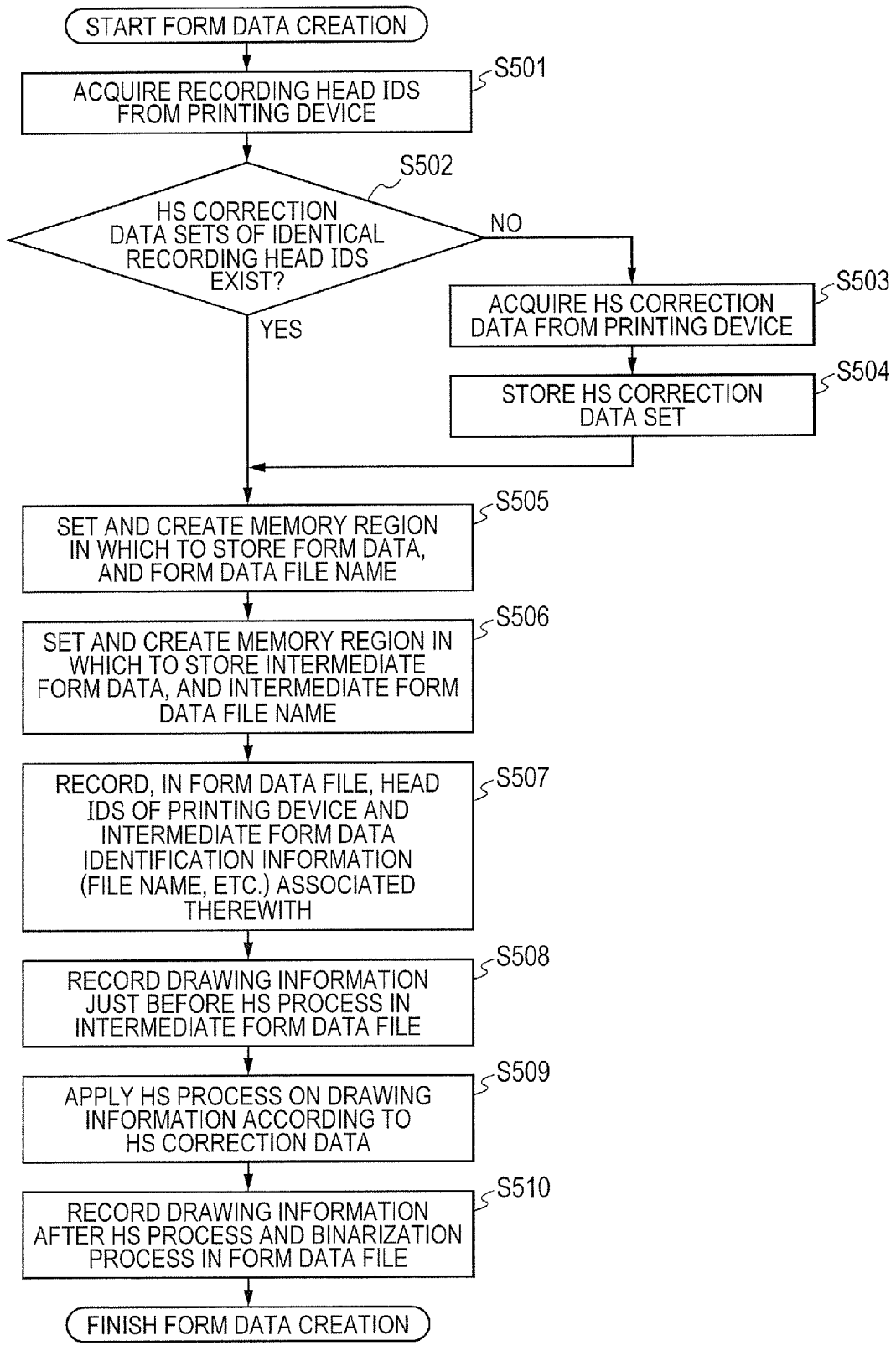
FIG. 5 is a view illustrating a procedure of a form data creating process.

Next will be described a process of creating form data to be used in the form overlay printing and storing the form data in the host PC 101. FIG. 5 is a flowchart illustrating a procedure of a form data creating process. Each process illustrated in FIG. 5 is realized by the CPU 220 performing a printer driver loaded in the memory 222, for example. Initially, the user instructs form data creation for the form overlay printing via the input device 232. In response to that, the CPU 220 acquires recording head IDs for all ink colors from the printing device 102 (S501). Subsequently, the CPU 220 judges whether or not HS correction data sets having the recording head IDs for all ink colors acquired in S501 have been stored in the RAM 222 or the HDD 227 (hereinafter referred to as a memory region). Here, if it is judged that the HS correction data sets have been stored, the process proceeds to S505. On the other hand, if it is judged that the HS correction data sets have not been stored, the process proceeds to S503. In S503, with regard to a recording head ID that is judged not to be stored in S502, the CPU 220 acquires its HS correction data set from the printing device 102. Then, the CPU 220 stores the HS correction data thus acquired in S503 into the memory region (S504). At this point, the host PC 101 acquires respective pieces of HS correction data for all ink colors currently included in the printing device 102.

On a user interface screen displayed on a display by an application of the form overlay printing, for example, the user sets a storage area and a file name for a form data file (S505). The CPU 220 creates a form data file (described later), sets to the form data file the form data file name instructed by the user, and stores the form data file thus created in the storage area instructed by the user.

Subsequently, the CPU 220 creates an intermediate form data file (described later), and stores the intermediate form data file in a memory region in association with the form data file created in S505 (S506). The intermediate form data file is not created in response to an instruction from the user, but when the form data file is created in S505, an intermediate form data file associated with the form data file is automatically created in S506. The intermediate form data file may be stored in the same storage area as the form data file, or may be stored in a different storage area. Further, a file name thereof is set to a name by which it is possible to recognize that the file name is associated with the file name of the form data file.

Subsequently, the CPU 220 describes, in the form data file created in S505, the recording head IDs of the printing device 102 and identification information of the intermediate form data file thus associated with the form data file. The identification information of the intermediate form data file is, for example, a storage area and a file name of the intermediate form data file (S507). Then, the CPU 220 describes, in the intermediate form data file created in S506, drawing information of each ink color just before the HS process is performed (S508). Subsequently, the CPU 220 performs the HS process on the drawing information of each ink color based on HS correction data of each ink color stored in the memory region (S509). Then, CPU 220 performs a binarization process according to a dither pattern method or an error diffusion method, on the drawing information of each ink color on which the HS process is performed in S509. The drawing information of each ink color on which those processes are performed is described in the form data file created in S505 (S510).

Figure 6:
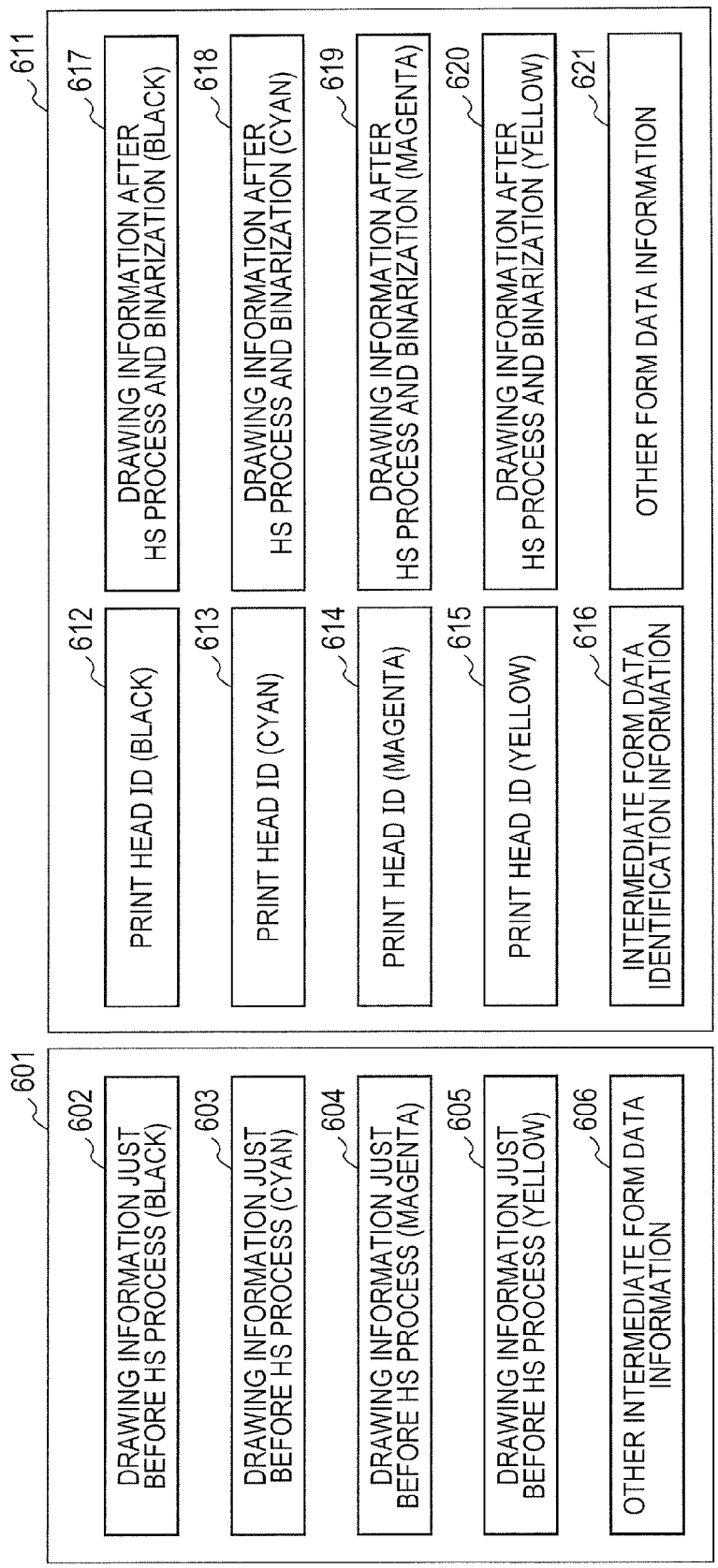
FIG. 6 is a view illustrating a form data file and an intermediate form data file.

FIG. 6 is a view illustrating an example of the form data file and the intermediate form data file stored in the memory region of the host PC 101 in the process of FIG. 5. An intermediate form data file 601 of FIG. 6 is the intermediate form data file created in S506, and as has been described in S508, the drawing information just before the HS process (drawing information on which the HS process is not performed) is described per ink color. Further, information of a printing paper size, a paper type, a print direction, and the like is described as other intermediate information data. A form data file 611 in FIG. 6 is the form data file created in S505 (a data file in which corrected form data is described). As has been described in S507, in the form data file 611, the recording heads ID, the identification information of the associated intermediate form data, the drawing information on which the HS process and the binarization process are performed are described. Further, information of a printing paper size, a paper type, a print direction, and the like is described as other form data information.

As described above, in the present embodiment, the host PC 101 initially acquires the recording heads ID and the pieces of HS correction data for all ink colors of the printing device 102. Then, the host PC 101 creates a form data file including each of the recording head IDs of the printing device 102, drawing information per ink color on which the HS process and the binarization process are performed, and identification information of a corresponding intermediate form data file. The host PC 101 further creates an intermediate form data file including drawing information per ink color before execution of the HS process and the binarization process. In the present embodiment, the form overlay printing is performed by use of the form data file and the intermediate form data file thus prepared.

Here, the following describes effects of the present embodiment. The present embodiment focuses on each processing step at which RGB image data that is drawing-processed by an application program is subjected to color conversion into ink color data defined by an ink color space. Initially, recording-head-independent RGB image data that is drawing-processed by the application program is converted into recording-head-independent ink color data by luminance-density conversion. Then, a under color removal process (UCR) and the like are performed on the ink color data, and when the head shading process is further performed, the ink color data is converted into recording-head-dependent ink color data. At this stage, the recording-head-dependent ink color data is multiple-valued ink color data, but when the binarization process is performed thereon, the ink color data is converted into recording-head-dependent binary ink color data, which is usable in ink discharge control in the printing device 102.

That is, in the present embodiment, intermediate form data subjected to processes (luminance-density conversion and the like) just before the head shading, and form data subjected to the head shading and the binarization process are prepared in the host PC 101. Here, in a case where respective pieces of drawing information of respective ink color in the form data are ones on which density characteristics of the recording heads currently included in the printing device 102 are reflected, the host PC 101 transmits the form data and overlay data to the printing device 102, and the form overlay printing is performed. As a result, processes necessary for ink discharge have been all performed on the RGB image data, so that a printing time after the form overlay printing is instructed is speeded up. On the other hand, in a case where the respective pieces of drawing information of the respective ink colors in the form data are not ones on which the density characteristics of the recording heads currently included in the printing device 102 are reflected, the host PC 101 performs the head shading process and the binarization process on the intermediate form data based on the density characteristics of the current recording heads, and transmits the intermediate form data and the overlay data to the printing device 102, so that the form overlay printing is performed. As a result, it is not necessary to perform processes that take time, such as luminance-density conversion, so that a printing time after the form overlay printing is instructed is speeded up. Further, even if a recording head is replaced by the user, the head shading correction can reflect density characteristics of record heads currently provided, so that it is possible to maintain image quality in the form overlay printing.

Figure 7:
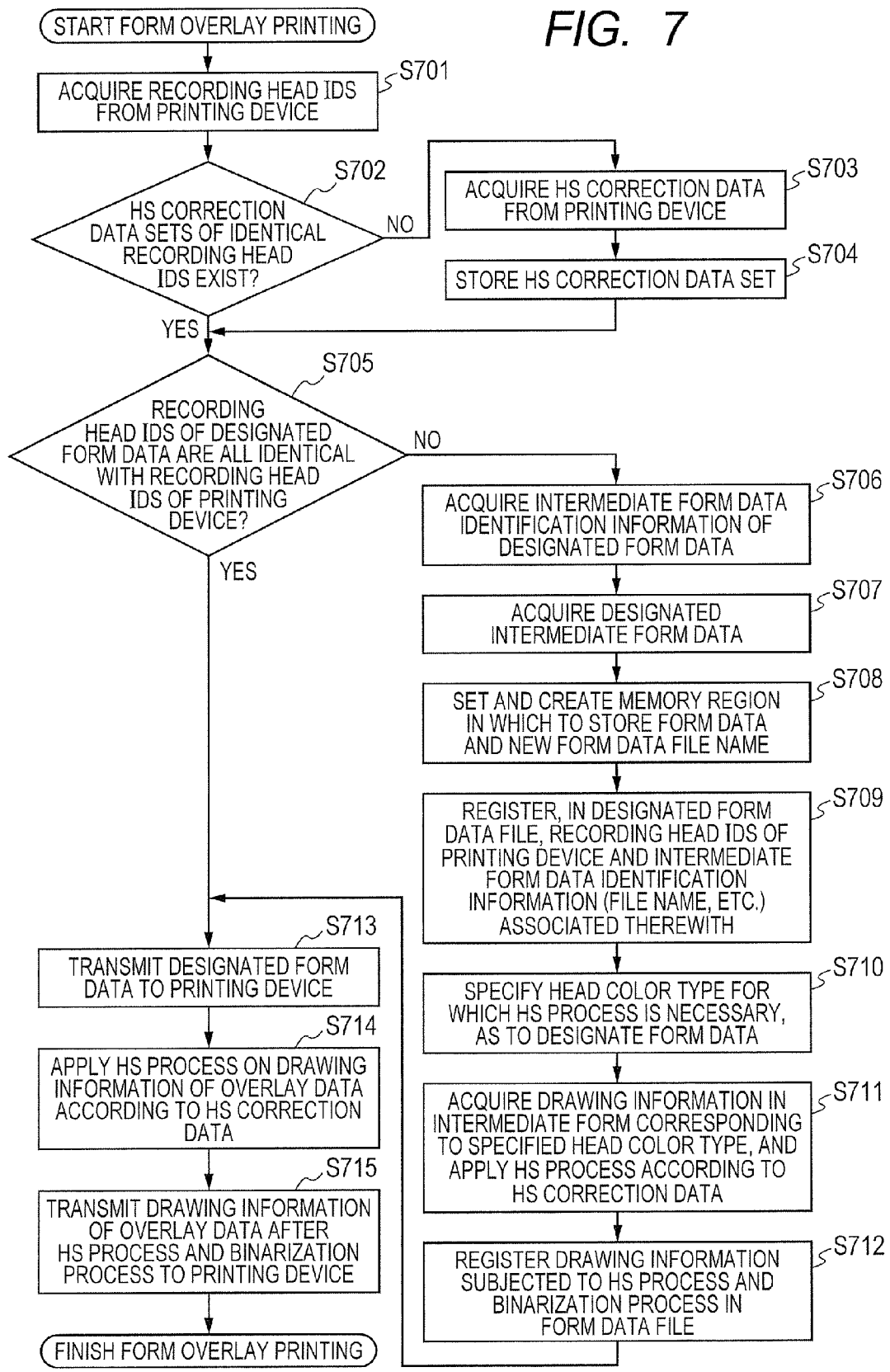
FIG. 7 is a view illustrating a procedure of a process of form overlay printing.

FIG. 7 is a flowchart illustrating a procedure of a process of the form overlay printing. The process of FIG. 7 is realized by the CPU 220 of the host PC 101 performing a printer driver loaded in the memory 222. The user designates overlay data via the input device 232 on the user interface screen by an application for the form overlay printing, and instructs execution of the form overlay printing. The CPU 220 acquires recording head IDs for all ink colors from the printing device 102 (S701: an example of reacquisition). Subsequently, the CPU 220 judges whether or not HS correction data sets having the recording head IDs for all ink colors acquired in S701 have been stored in the memory region (S702). Here, if it is judged that the HS correction data sets have been stored, the process proceeds to S705. On the other hand, if it is judged that the HS correction data sets have not been stored, the process proceeds to S703. In S703, with regard to a recording head ID that is judged not to be stored in S702, the CPU 220 acquires its HS correction data set from the printing device 102. Then, the CPU 220 stores the HS correction data thus acquired in S703 into the memory region (S704). At this point, the host PC 101 acquires respective pieces of HS correction data for all ink colors currently included in the printing device 102.

Then, the CPU 220 receives a designation of a form data file from the user so as to incorporate overlay data therein on the display. It is judged whether or not respective recording head IDs described in the form data file thus designated are identical with the recording head IDs currently included in the printing device 102 (S705). Here, when it is judged that they are identical with each other, the process proceeds to S713, and when it is judged that they are not identical with each other, the process proceeds to S706.

In S713, the CPU 220 transmits pieces of drawing information (pieces of drawing information on which the HS process and the binarization process have been performed) of respective ink colors of the designated form data file to the printing device 102. In S714, the CPU 220 performs the HS process on the overlay data according to pieces of HS correction data for the respective ink colors. In S715, the CPU 220 further performs the binarization process on the overlay data, and transmits, to the printing device 102, drawing information of the overlay data on which the binarization process is performed. After that, the printing device 102 performs the form overlay printing based on the drawing information described in the received form data file and the drawing information of the overlay data.

The following describes a case where it is judged that the respective recording head IDs described in the form data file designated in S705 are not fully identical with the respective recording head IDs currently included in the printing device 102.

The CPU 220 refers to intermediate form data identification information 616 of the designated form data file, and acquires a storage area, a file name, etc., of an intermediate form data file associated with the designated form data file (S706). Then, the CPU 220 acquires the intermediate form data file (S707). Subsequently, the CPU 220 creates a new form data file. The CPU 220 copies the form data file designated by the user, as the new form data file. At this time, the CPU 220 newly sets a storage area and a file name for the new form data file (S708). The CPU 220 describes, in the new form data file, the respective recording head IDs currently included in the printing device 102 and the intermediate form data identification information. The intermediate form data identification information described herein is the storage area and the file name of the intermediate form data file acquired in S706 (S709). When the new form data file is thus created in S708 by a copy operation, the current respective recording head IDs of the printing device 102 will be overwritten.

Then, the CPU 220 specifies an ink color that is not identical with any of the respective recording head IDs currently included in the printing device 102 in S705 (S710). The CPU 220 acquires that piece of drawing information of the intermediate form data file which corresponds to the ink color thus specified, and performs the HS process thereon according to HS correction data for the ink color (S711). The CPU 220 further performs the binarization process thereon, and consequently describes, in the new form data file, the drawing information on which the HS process and the binarization process are performed. At this time, when the new form data file is created by the copy operation in S708, the new form data file is overwritten by the drawing information on which the HS process and the binarization process are performed. After the process of S712, the new form data file is treated as the designated form data designated by the user in S705, and the processes after S713 are performed.

As described above, in the present embodiment, in a case where there is no drawing information on which the HS process and binarization process are performed, due to replacement of a recording head of the printing device 102 at the time when the form overlay printing is performed, the drawing information is created from that drawing information just before the HS process is performed which is included in an intermediate form data file. That drawing information just before the HS process is performed which is included in the intermediate form data file has been already subjected to processes except for the HS process, and therefore it is possible to effectively prepare drawing information on which the HS process and the binarization process are performed, corresponding to the recording head IDs currently included in the printing device 102.

The present invention includes an aspect in which the host PC 101 serving as a print control device is incorporated in the printing device 102 and the print control device transmits overlay data on which head shading correction has been performed (original document data) and form data on which head shading correction has been performed to the recording head control section 205 and the recording head 22 serving as an inkjet recording apparatus. Further, in the present invention, the structure "The print control device transmits data obtained by incorporating overlay data on which head shading correction has been performed (original document data) into form data on which head shading correction has been performed to the inkjet recording apparatus." is included in the structure "The print control device transmits overlay data on which head shading correction has been performed (original document data) and form data on which head shading correction has been performed to the inkjet recording apparatus."

The preferred embodiment of the present invention has been described above, but various modifications and alternations can be performed in addition to the above description.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-265650, filed Dec. 4, 2012, and No. 2013-221475, filed Oct. 24, 2013, which are hereby incorporated by reference herein in their entirety.

What is claimed is:

1. A print control device communicably connected to an inkjet recording apparatus capable of printing an image based on image data, the print control device comprising:
  a correction unit that performs head shading correction on the image data based on information of a characteristic of a nozzle of a recording head provided in the inkjet recording apparatus;
  a storage unit that stores corrected image data that has been corrected by the correction unit;
  a transmission unit that transmits to the inkjet recording apparatus the corrected image data that is corrected by the correction unit; and
  a control unit that causes the correction unit to perform head shading correction on the image data based on information of a characteristic of a nozzle of a newly attached recording head when the recording head of the inkjet recording apparatus is replaced and causes the transmission unit to transmit to the inkjet recording apparatus the corrected image data corresponding to the newly attached recording head, and causes the transmission unit to transmit to the inkjet recording apparatus the corrected image data that has already been corrected by the correction unit and stored in the storage unit when the recording head of the inkjet recording apparatus is not replaced.

2. The print control device according to claim 1, wherein the inkjet recording apparatus is capable of performing form overlay printing for incorporating overlay data into form data.

3. The print control device according to claim 2, wherein the storage unit stores the form data in association with information on the recording head as the image data.

4. The print control device according to claim 3, comprising:
  an acquisition unit that acquires information on the recording head provided in the inkjet recording apparatus; and a judging unit that judges whether or not the information on the recording head which is stored in the storage unit is identical with the information on the recording head which is acquired by the acquisition unit, wherein in a case where the judging unit judges that information on that recording head which is acquired by the acquisition unit is identical with information on the recording head which is stored in the storage unit, the control unit causes the transmission unit to transmit to the inkjet recording apparatus corrected form data corresponding to the information on the recording head which is stored in the storage unit, together with the overlay data at the time of performing the form overlay printing; and in a case where the judging unit judges that the information on the recording head which is acquired by the acquisition unit is not identical with the information on the recording head which is stored in the storage unit, the control unit causes the correction unit to perform head shading correction corresponding to the information on the recording head which is acquired by the acquisition unit with respect to the form data so as to create the corrected form data, and the control unit causes the transmission unit to transmit to the inkjet recording apparatus the corrected form data thus created together with the overlay data at the time of performing the form overlay printing.

5. The print control device according to claim 4, wherein the acquisition unit acquires density characteristic information of a nozzle for each ink color from the inkjet recording apparatus.

6. The print control device according to claim 1, wherein the image data is data defined by an ink color space.

7. The print control device according to claim 1, wherein the corrected image data is data on which a binarization process is performed.

8. The print control device according to claim 1, wherein the recording head is a line-type recording head.

9. The print control device according to claim 1, wherein the inkjet recording apparatus comprises an information storage unit that stores the information of a characteristic of the nozzle of the recording head.

10. A print control method performed in a print control device communicably connected to an inkjet recording apparatus capable of printing an image based on image data, the print control method comprising:

a correction step of performing head shading correction on the image data based on information corresponding to a characteristic of a nozzle of a recording head provided in the inkjet recording apparatus;

a storage step of storing corrected image data that has been corrected in the correction step; and a transmission step of transmitting to the inkjet recording apparatus corrected image data that is corrected in the correction step based on information of a characteristic of a nozzle of a newly attached recording head when the recording head of the inkjet recording apparatus is replaced, wherein the corrected image data that has already been corrected in the correction step is stored in the storage step when the recoding head of the inkjet recording apparatus is not replaced.

11. The print control method according to claim 10, wherein the print control device is capable of performing form overlay printing for incorporating overlay data into form data.

12. A printing system, comprising:

an inkjet recording apparatus capable of printing an image based on image data, and a print control device communicably connected to the inkjet recording apparatus, wherein the print control device comprises:

a correction unit that performs head shading correction on the image data based on information of a characteristic of a nozzle of a recording head provided in the inkjet recording apparatus;

a storage unit that stores corrected image data that has been corrected by the correction unit;

a transmission unit that transmits to the inkjet recording apparatus the corrected image data that is corrected by the correction unit; and a control unit that causes the correction unit to perform head shading correction on the image data based on information of a characteristic of a nozzle of a newly attached recording head when the recording head of the inkjet recording apparatus is replaced and causes the transmission unit to transmit to the inkjet recording apparatus the corrected image data corresponding to the newly attached recording head, and causes the transmission unit to transmit to the inkjet recording apparatus the corrected image data that has already been corrected by the correction unit and stored in the storage unit when the recording head of the inkjet recording apparatus is not replaced.

13. The printing system according to claim 12, wherein the inkjet recording apparatus is capable of performing form overlay printing for incorporating overlay data into form data.

14. An inkjet recording apparatus capable of printing an image based on image data, comprising:

a recording unit that performs recording in a recording medium; and a control unit that performs printing by corrected image data that is corrected based on information of a characteristic of a nozzle of a newly attached recording head when a recording head provided in the recording unit is replaced, and performs printing by the corrected image data that has already been corrected and stored based on information of a characteristic of a nozzle of the recording head provided in the recording unit when the recording head provided in the recording unit is not replaced.

15. The inkjet recording apparatus according to claim 14, wherein the inkjet recording apparatus is capable of performing form overlay printing for incorporating overlay data into form data.

* * * * *